(12) United States Patent
Nomura et al.

(10) Patent No.: US 7,254,622 B2
(45) Date of Patent: Aug. 7, 2007

(54) VIDEO-ON-DEMAND SYSTEM

(76) Inventors: Tetsuya Nomura, 827 Pacific Ave. #212, San Francisco, CA (US) 94133; Tommy Sun, 827 Pacific Ave. #212, San Francisco, CA (US) 94133

( * ) Notice: Subject to any disclaimer, the term of this patent is extended or adjusted under 35 U.S.C. 154(b) by 959 days.

(21) Appl. No.: 09/738,425

(22) Filed: Dec. 15, 2000

(65) Prior Publication Data

US 2002/0078176 A1    Jun. 20, 2002

(51) Int. Cl.
*G06F 15/16* (2006.01)
*H04N 7/173* (2006.01)

(52) U.S. Cl. .......................................... 709/219; 725/98

(58) Field of Classification Search ................. 709/217, 709/219, 230, 231; 725/98
See application file for complete search history.

(56) References Cited

U.S. PATENT DOCUMENTS

| | | | |
|---|---|---|---|
| 5,583,561 A | | 12/1996 | Baker et al. |
| 5,594,491 A | | 1/1997 | Hodge et al. |
| 5,600,573 A | * | 2/1997 | Hendricks et al. .......... 725/109 |
| 6,005,561 A | * | 12/1999 | Hawkins et al. ......... 715/500.1 |
| 6,005,599 A | | 12/1999 | Asai et al. |
| 7,168,086 B1 | * | 1/2007 | Carpenter et al. ............ 725/98 |

* cited by examiner

*Primary Examiner*—David Wiley
*Assistant Examiner*—J. Bret Dennison
(74) *Attorney, Agent, or Firm*—James J. Leary

(57) ABSTRACT

A video-on-demand system provides efficient commercial distribution for renting and/or selling movies, video programs, video games and electronic data. Data input stations upload original video data from videotapes, videocassettes, videodisks or film, or from electronic data format on transferable storage media or over a telecommunications line. A video data capture computer converts the original video data into a preferred video data storage format and stores the video data files in a first generation video data storage unit. The video data files are sorted by categories and classified in indexed master files stored on a second generation video data storage unit. NTSC, PAL and/or HDTV versions of the video data files are created and stored in separate data storage units for serving different markets. Customers access the system through computer servers connected to the Internet. The computer servers access the video data file in the data storage units and create a temporary video data file, which is downloaded to the customer via the Internet. The video data file is downloaded at high speed and stored on the customer's video player device for viewing at a later time. The video data files can be downloaded, stored and viewed on a desktop computer, a laptop computer, palmtop computer, a set-top data storage device connected to a television set, video game device, or a personal digital assistant, cellular telephone or pager with video capabilities. The system includes back-up mirror storage files at all levels of the system for security against data loss.

12 Claims, 1 Drawing Sheet

VIDEO-ON-DEMAND SYSTEM

FIELD OF THE INVENTION

The present invention relates to a video-on-demand system that provides movies, video programs and other prerecorded materials to a remote user. In particular, it relates to a high speed, reliable video-on-demand system with data corruption resistance for storing, selecting, downloading and playing prerecorded video materials.

BACKGROUND OF THE INVENTION

Home viewing of prerecorded video programs and movies has become a major form of entertainment in this country and throughout much of the world. Technologies such as videocassette players and videodisk players, e.g. digital video disk (DVD) and laser disk players, allow users to view prerecorded video programs and movies at home on their own television sets. Viewing prerecorded video programs has many advantages over watching programs and movies on broadcast television. Viewers can choose their own programs and movies and watch them at a time of their own choosing. Video players also allow users to stop, pause, replay, slow motion replay and fast forward the program at any time while viewing. With broadcast television on the other hand, viewers have a limited selection of programs and movies, which are shown on a fixed schedule. Pay-per-view television offered by cable television and satellite television broadcasting companies has increased the selection of programs and movies available and the choices of viewing times, but the practical limitations of broadcast bandwidth restricts pay-per-view television to a limited selection and fixed schedules.

The popularity of prerecorded video programs and movies as home entertainment has given rise to a large infrastructure for production and commercial distribution of prerecorded video materials. Video stores that rent and/or sell prerecorded movies and other video programs on videocassettes and/or video disks have become ubiquitous. Video rental stores offer a broad selection of movies that users can take home and view at any time during the rental period, which is generally from one to several days. However, video rental stores present a number of inconveniences for the user. The user must travel to the video rental store to select and bring home a video to watch, which is inconvenient and time consuming. Store hours may be limited. The selection of movies available can be limited by the number of copies on hand. Popular movies may not be available if the number of copies on hand is not sufficient to meet the demand by customers. After viewing it, the user must travel to the video rental store again to return the video. Late fees and penalties for damage or loss of videos can be a significant drawback for some users. Broadcast television, for all of its limitations, has the advantage that viewers do not have to leave their homes because the programming is transmitted directly to their television sets.

This video distribution system is also a very inefficient use of resources. Vast quantities of video recording media, such as videocassettes and videodisks, must be manufactured and recorded to supply all of the video stores. Transportation costs, storage costs and the cost of retail space and personnel all add to the expense of video distribution.

It would be desirable to provide a system for distribution of movies and other video programs for home viewing that has the advantages of broadcast television and of the current video distribution system, while avoiding many of the disadvantages of both. To this end, it is desirable to provide a system that allows viewers to select and buy and/or rent movies and other video programming content without having to leave their homes. The system should transmit the video programming content directly to the viewer's home or other selected locations. The video programming content should be provided in a format that allows the viewer to play the movie or video at any desired time and allows the viewer to stop, pause, replay, slow motion replay and fast forward the program at any time while viewing. The system should provide a broad selection of movies and other video programs without the costs and inefficiencies associated with the current video distribution system that relies on multiple copies of videos distributed through a myriad of local video rental stores. The system should allow multiple users to view a movie or video simultaneously without the need to keep an inventory of multiple copies.

Video-on-demand systems have been suggested as an alternative to the current video distribution system. To date, however, because of technical limitations such systems have not been successfully commercialized, except on a very small scale. For example, centralized video-on-demand systems are available for hotels and similar applications. Examples of such systems are described in U.S. Pat. No. 6,009,465 granted to Decker, et. al. for Entertainment and information systems and related management networks for a remote video delivery system, and U.S. reissue Pat. No. RE34,611 issued to Fenwick for Video selection and distribution system. These systems can only handle a small number of viewers at any one time because they are limited by the number of video players in the system and the number of copies of any particular video on hand.

A convergence of technologies from the audiovisual, computer and telecommunications fields now makes it possible to create a practical large-scale centralized video-on-demand system for selecting, downloading and playing prerecorded materials. To be commercially successful, such a video-on-demand system must be high speed, reliable, robust and fault tolerant and it must be configured to resist data corruption.

SUMMARY OF THE INVENTION

In keeping with the foregoing discussion, the present invention takes the form of a video-on-demand system for storing, selecting, downloading and playing prerecorded video materials. The video-on-demand system provides capabilities of efficient commercial distribution for renting and/or selling of movies, video programs and other forms of electronic entertainment materials, such as video games, music videos and video books, and electronic data. The system can also be used to provide video content for web sites, such as video home pages, and for distribution of video messages or video mail. The system is configured to capture video data of movies and other video programs from various storage media into a high speed, rapidly accessible electronic data storage medium. Data input stations are provided to upload original video data of movies or other video programs from their original storage medium, for example from videotapes, videocassettes, videodisks or film, or from electronic data format on transferable storage media or over a telecommunications line, such as a telephone line, multimedia cable, fiberoptic cable, wireless telecommunications, etc.

A video data capture computer converts the original video data files into a preferred video data storage format and stores the video data files in a first generation video data storage unit. If desired, the video data files may be stored in a compressed data storage format. The first generation video data storage unit includes data libraries containing the latest on-line news data, rental item data and selling item data. A back-up first generation video data storage unit is provided as security against data loss or corruption. The video data files are sorted by categories of the movies and other video programs and are classified in indexed master files stored on a second generation video data storage unit. A back-up second generation video data storage unit is provided as security against data loss or corruption.

The system preferably includes capabilities of converting the video data files to any known video display format for worldwide distribution and viewing. For example, NTSC, PAL and/or HDTV versions of the video data files can be created and stored in separate data storage units as appropriate for the markets to be served by the system. Preferably, the system also includes back-up data storage units for these video data files as security against data loss or corruption.

Customer access to the video data files is provided by one or more remotely accessible computer servers through an Internet Service Provider (ISP) and/or an Application Service Provider (ASP) interface. Access to the system is provided via the Internet and/or World Wide Web (WWW), telephone lines, digital subscriber lines (DSL), cable television lines, multimedia cable, and fiberoptic cable connections, and wireless access is provided through a wireless Internet Service Provider (ISP) and/or an Application Service Provider (ASP) interface. The computer servers are programmed with file handling, order processing and accounting and billing software. The system also includes a data storage unit for an accounting and billing record database and a back-up data storage unit.

When the system receives a customer request, the computer server through which the request is received accesses the video data file in the appropriate data storage unit and creates a temporary video data file by transferring the video data over a high speed data link. The video data file is then downloaded to the customer via the appropriate ISP/ASP interface. The video data file is downloaded at high speed and stored on the customer's video player device for viewing at a later time. The downloading of video data files to the customer is continuously monitored by error detection and correction software.

The customer can contact and interact with the video-on-demand system in a number of different ways, such as through a website connection on the Internet or the World Wide Web, through a cable television subscriber network, a local area network (LAN) or a wide area network (WAN) connected via an Internet connection or a direct connection via cable or telephone lines or through a wireless telecommunications system that use satellites and/or earthstations to receive and transmit data, such as a satellite television network, a cellular telephone network or a pager or wireless personal digital assistant (PDA) system connection. The system can also be implemented through a PBX network or a peer-to-peer network, which may or may not be connected to the Internet. The connection between the customer and the video-on-demand system can be asymmetrical.

The video data files can be downloaded, stored and viewed in a number of different ways by the customer. For example, the video data files can be downloaded, stored and viewed on a desktop computer, a laptop computer, a palmtop computer or other mobile computer. The movie or video program can be viewed directly on the computer monitor or it can be recorded on a transferable storage medium to be viewed on a separate video playing device. Miniature mobile or wearable computers or video playback devices with head mounted displays provide the ultimate in portability for video viewing. The video data files can also be downloaded and stored on a set-top data storage device that is connected to a television set or monitor for viewing. The video data files can also be downloaded, stored and viewed on personal digital assistants, cellular telephones and pagers with video capabilities. Video data files and/or video game software can be downloaded, stored and viewed on a video game device.

In operation, a customer initiates a transaction by contacting the video-on-demand system through one of the various means described above. The customer can browse, search and select one or more movies or other video programs to rent or purchase. Descriptions, reviews, advertisements, clips and trailers of the video materials may be provided to help customers make their selections. The customer selects whether he or she wishes to purchase or rent the video selections and, if appropriate, specifies a time period for the rental. The computer server completes the billing and accounting portion of the transaction electronically over the Internet using a secure Internet payment protocol.

Purchased and/or rented video data files will preferably be downloaded in a copy protected format to prevent unauthorized reproduction or resale of the video data files by the customer. In addition, rented video data files will preferably be downloaded in a time sensitive format that will delete the file or make it inaccessible or unviewable after the expiration of the specified rental period and/or after a specified number of viewings.

The video-on-demand system of the present invention is configured to be high speed, reliable, robust and fault tolerant and to resist data corruption. Preferably, the back-up data storage units, also known as mirror storage units, at each level of the system are housed at separate location that is protected from natural disaster, electrical power black out, accidents and so forth for security against data loss. The multitiered architecture of the system protects the original video data files from data corruption. If the video data files at any level of the system are ever subjected to data loss or data corruption, the video data files can be refreshed from the back-up video data files on the same level of the system or recreated from video data files or back-up files on a higher level of the system. The transfer and downloading of video data files is continuously monitored by error detection and correction software. If the software detects an error in the video data files, the transfer is stopped and started over from the last point where the video data file was known to be not corrupted so that the transfer does not have to be started over from the beginning. This saves time and allows the system to efficiently serve more customers. If repeated errors are detected, the video data file can be quickly refreshed from a data storage unit at a higher level of the system.

These and other advantages of the video-on-demand system of the present invention will be evident to those skilled in the art upon reading and understanding the following description along with the accompanying drawing figure.

DETAILED DESCRIPTION OF THE INVENTION

Figure 1:
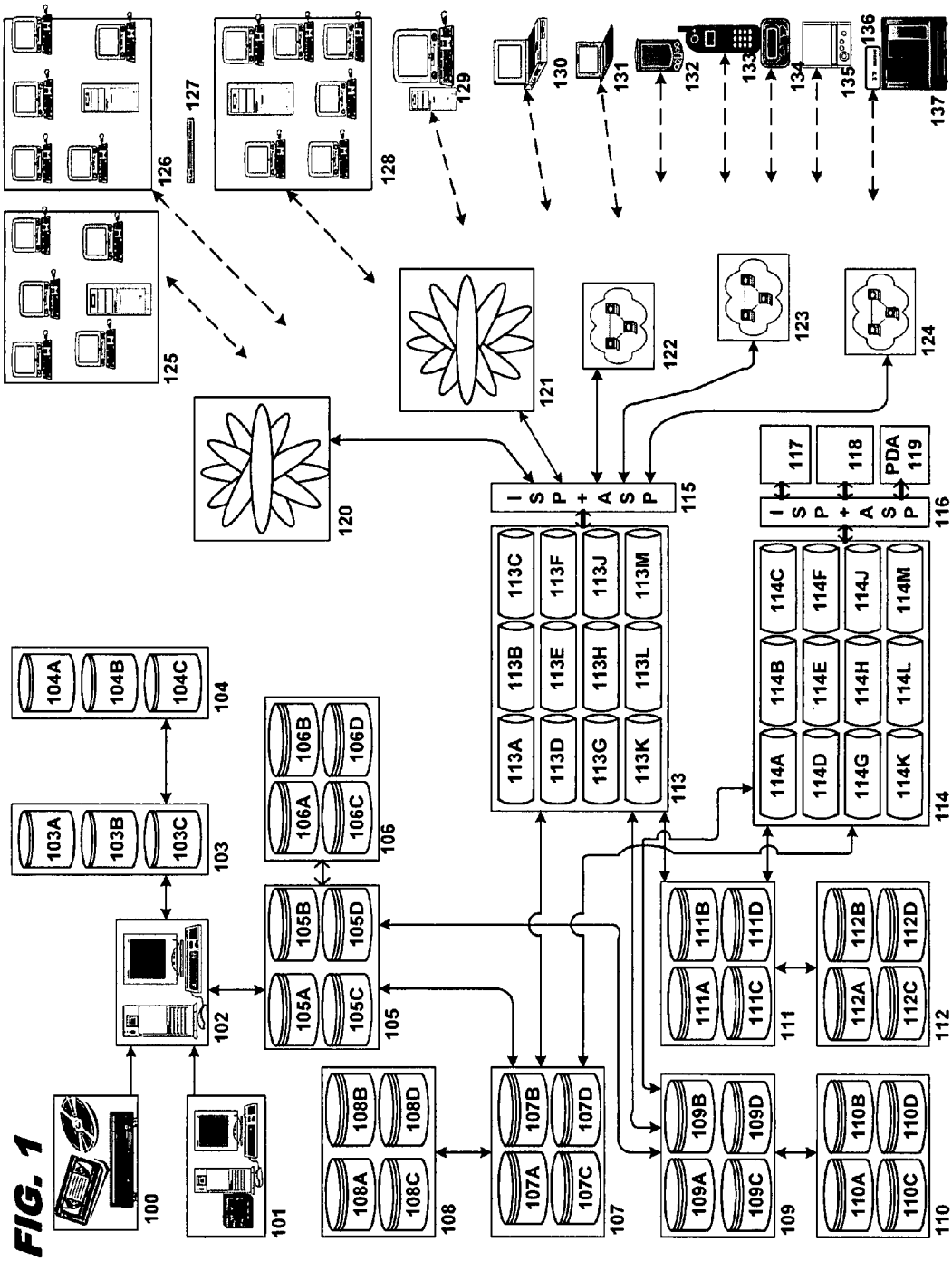
FIG. 1 shows a schematic representation of the video-on-demand system of the present invention.

FIG. 1 shows a schematic representation of the video-on-demand system of the present invention for storing, selecting, downloading and playing prerecorded video materials. The video-on-demand system provides capabilities of efficient commercial distribution for renting and/or selling of movies and other video programs. The system is also useful for providing publicly accessible video libraries with video-on-demand capabilities. The system can also be used for distribution of other forms of electronic entertainment materials, such as video games, music videos and video books, and electronic data. The system can also be used to provide video content for web sites, such as video home pages, and for distribution of video messages or video mail.

The video-on-demand system is configured to capture video data of movies and other video programs from various storage media into a high speed, rapidly accessible electronic data storage medium. A first data input station 100 allows original video data of movies or other video programs to be entered into the system from their original storage medium, for example from videotapes, videocassettes or videodisks. The first data input station 100 includes at least one video format reading device such as a videotape, videocassette or videodisk player for reading the video data into the system. Preferably, the video format reading device operates at high-speed for efficient input of video data. The first data input station 100 may also have the capability of converting audiovisual information from film into video data usable by the system. The original storage media may be archived in case any of the video data needs to be restored at a later date.

A second data input station 101 allows original video data of movies or other video programs to be entered into the system from electronic data format on transferable storage media or over a telecommunications line, such as a telephone line, multimedia cable, fiberoptic cable, wireless telecommunications, etc. The second data input station 101 may include a reading device, a high speed telecommunications interface and/or a computer for entering the video data from electronic data format into the system.

The original video data from the first data input station 100 and the second data input station 101 enter the system though a video data capture computer 102. The video data capture computer 102 converts the original video data files into the preferred video data storage format and stores the video data files in the first generation video data storage unit 103. If desired, the video data capture computer 102 may store the video data files in a compressed data storage format. In a particularly preferred embodiment, the first generation video data storage unit 103 is configured to include data libraries containing the latest on-line news data 103A, rental item data 103B and selling item data 103C. The data libraries 103A, 103B, 103C may be housed in physically separate data storage units or they may be housed in one multipurpose data storage unit. The first generation video data storage unit 103 can be implemented using virtually any high speed, rapidly accessible electronic data storage medium, such as Winchester disk drive technology, hard disk drive technology, magnetic tape storage technology, solid state data storage technology, etc. Preferably, the first generation video data storage unit 103 uses a nonvolatile memory data storage medium for security of the data stored.

Preferably, the system also includes a back-up first generation video data storage unit 104, containing back-up data libraries 104A, 104B, 104C, housed at another location that is protected from natural disaster, electrical power black out, accidents and so forth for security against data loss. Alternatively or in addition, a back-up first generation video data storage unit 104 may be housed at the same location as the first generation video data storage unit 103, but using a separate electrical power supply for security against data loss. If the first generation video data storage unit 103 is ever subjected to data loss or data corruption, the data libraries 103A, 103B, 103C can be recreated from the back-up data libraries 104A, 104B, 104C on the back-up first generation video data storage unit 104.

The video data files from the first generation video data storage unit 103 are also stored on a second generation video data storage unit 105. The video data files in the second generation video data storage unit 105 are sorted by categories of the movies and other video programs and are classified in indexed master files 105A, 105B, 105C, 105D, etc. The second generation video data storage unit 105 can be implemented using virtually any high speed, rapidly accessible electronic data storage medium. Preferably, the system also includes a back-up second generation video data storage unit 106, containing back-up master files 106A, 106B, 106C, 106D, etc. housed at another location for security against data loss.

The system preferably includes capabilities of converting the video data files to any known video display format for worldwide distribution and viewing. For example, in a preferred embodiment, the system includes a data storage unit 107 with a North American version of the video data files converted to National Television Standards Committee (NTSC) format for the United States, Canada and Mexico and a data storage unit 109 with a Phase Alternation Line (PAL) version of the video data files for Europe, Central and South America, and some parts of Asia. A data storage unit may also be provided for a version of the video data files in high definition television (HDTV) format or other formats now known or to be devised in the future. Preferably, the system also includes back-up data storage units 108, 110 housed at another location for security against data loss from data storage units 107, 109.

The system also includes a data storage unit 111 for an accounting and billing record database and a back-up data storage unit 112 housed at another location for security against data loss from data storage unit 111.

Customer access to the video data of movies and other video programs is provided by a remotely accessible computer server 113 through an Internet Service Provider (ISP) and/or an Application Service Provider (ASP) interface 116. Preferably, the remotely accessible computer 113 provides customer access via the Internet and/or World Wide Web (WWW), as well as through telephone lines, digital subscriber lines (DSL), cable television lines, multimedia cable, and fiberoptic cable connections. Wireless customer access to the video data of movies and other video programs is also provided by a second remotely accessible computer server 114 through a wireless Internet Service Provider (ISP) and/or an Application Service Provider (ASP) interface 117.

When the system receives a customer request, the computer server 113, 114 through which the request is received accesses the video data file in the appropriate data storage unit 105, 107, 109 and creates a temporary video data file 113A, 113B . . . 113M, 114A, 114B . . . 114M by transferring the video data over a high speed data link. The video data file is then downloaded to the customer via the appropriate ISP/ASP interface 115, 116. A video data file for a full length feature film can be downloaded in approximately six minutes using present data transmission technology. Improvements in the download speed can be expected in the near future with advances in data transmission technology and data compression/decompression protocols. The customer can store and view the video data files of the selected movies at a time of his or her own choosing.

The temporary video data files 113A, 113B . . . 113M, 114A, 114B . . . 114M may be overwritten with new temporary video data files by the computer servers 113, 114 when new requests are received for other movies. In a particularly preferred embodiment of the system, the computer servers 113, 114 may preserve temporary video data files of popular or frequently requested movies in temporary memory storage for repeated downloads without having to access and transfer the video data files from the data storage units 107, 109. For extremely popular movies, more than one temporary video data file can be created to allow simultaneous downloading to more than one customer. These two strategies improve the response time of the system and allows it to efficiently serve more customers. When a particular movie wanes in popularity, the temporary video data file can be overwritten with a new temporary video data file.

The downloading of video data files to the customer is continuously monitored by error detection and correction software. If the software detects an error in downloading the video data files, the downloading is stopped and started over from the last point where the video data file was known to be not corrupted. Thus, the download does not have to be started over completely from the beginning. This saves time and allows the system to efficiently serve more customers. If repeated errors are detected, the temporary video data file can be quickly refreshed from the data storage unit 107, 109 by the computer server 113, 114.

The customer can contact and interact with the video-on-demand system in a number of different ways. It is anticipated that one of the most popular ways for customers to connect with the system will be through a website connection on the Internet or the World Wide Web 122. Other customers may choose to connect with the system via their cable television subscriber network 120. Additional and/or back-up connections via cable 121 or the Internet 123, 124 can be provided as a failsafe and/or to be added at times of peak demand. Customers who are connected to a local area network (LAN) 125, 126 or a wide area network (WAN) 128 can connect to the system through the LAN or WAN via an Internet router connection 127 or a direct connection via cable or telephone lines. Wireless connections to the system can be made via a wireless telecommunications systems 117 that use satellites and/or earthstations to receive and transmit data. Wireless connections to the system can also be made via a cellular telephone network 118 or a pager or wireless personal digital assistant (PDA) system connection 119.

The connection between the customer and the video-on-demand system can be asymmetrical. For example, the customer can contact the system via a telephone line connection or a wireless personal digital assistant to select and order a movie or other video program and the system can download the video data file via a high speed data connection such as a cable television network, DSL connection or satellite data connection.

The video data files can be stored and viewed in a number of different ways by the customer. The video data files can be downloaded in a directly readable format or they can be downloaded in a compressed data format. The video data files can be downloaded via the Internet or other connection to a desktop computer 129. With appropriate software, the video data file can be decompressed and the movie or video program can be viewed directly on the computer monitor. Alternatively, the computer 129 can record the video data file onto a transferable storage medium, such as a CD ROM or DVD, that can be played on a separate video playing device, such as a DVD player connected to a television set or monitor.

The video data files can also be downloaded via a wired or wireless connection to a laptop computer 130 or palmtop computer 131. The movie or video program can be viewed directly on the computer monitor or it can be recorded on a transferable storage medium to be viewed on a separate video playing device.

The video data files can be downloaded and stored on a set-top data storage device 136 that is connected to a television set or monitor 137. The data storage device 136 may be a dedicated, single-purpose device for storing and playing back downloaded movies and video programs. Alternatively, the data storage device 136 may be integrated with other audiovisual components, such as a video playing device, like a DVD player, and/or a television recording device, like a videocassette recorder (VCR) or more preferably a hard disk storage technology based recording device, such as those currently available under the brand names TIVO and REPLAY TV. Such an integrated device is distinguished from these existing products by its ability to receive high speed downloads of video data files, and, if necessary, to decompress the data files, for later viewing at normal speed.

It is anticipated that as the capabilities of such technologies expand, the video data files will also be able to be downloaded, stored and viewed on personal digital assistants 132, cellular telephones 133 and pagers 134. Video data files and/or video game software can be downloaded, stored and viewed on a video game device 135, which may be a stand-alone device or may be connected to a computer, monitor or television set.

The video-on-demand system is prepared for use by uploading video data files of movies, video programs and other prerecorded materials from their original storage media to the video data capture computer 102 using the first and second data input stations 100, 101. The video data capture computer 102 converts the original video data files into the preferred video data storage format and stores the video data files in the first generation video data storage unit 103. The video data files from the first generation video data storage unit 103 are sorted by categories and stored on the second generation video data storage unit 105 in indexed master files 105A, 105B, 105C, 105D, etc. NTSC, PAL and/or HDTV versions of the video data files are created and stored in data storage units 107, 109, as appropriate for the markets to be served by the system. The video data files in data storage units 107, 109 may be subsets of the complete video data files based on the expected popularity of particular movies and other forms of entertainment in the various markets to be served. At each step of the process, back-up files are created for security against data loss or corruption. Each of the back-up files may be created simultaneously with, or in a subsequent operation to, creation of the primary video data files. The video data files on each level can be updated or expanded at any time, for example for the addition of newly released movies to the collection. The computer servers 113, 114 are programmed with file handling, order processing and accounting and billing software and the system is connected to the various access networks through the ISP/ASP interfaces 115, 116 to make it ready for operation.

In operation, a customer initiates a transaction by contacting the video-on-demand system through one of the various means described above. In one particularly preferred method, the customer contacts the remotely accessible computer servers 113, 114 of the system through the ISP/ASP interfaces 115, 116 via a website accessible on the Internet or the World Wide Web. The website presents the customer with a graphical user interface (GUI) for selecting, ordering and downloading various video materials. The website can be contacted using any device that is Internet Protocol enabled. In an alternate method, the customer can contact the system using a voice activated user interface over a telephone or cellular telephone network using voice commands to select and order video materials. For computers or telecommunications devices with both capabilities, a combined graphical and voice activated user interface provides additional flexibility and convenience to the customer.

If this is a customer's first transaction on the video-on-demand system, the website or other user interface will take the customer through a registration procedure. New customers will be asked for identification and billing information and will be queried about the preferred viewing format and download pathway for video materials, depending on their hardware and software configuration. A unique account number and a password will be assigned to or selected by the customer. If desired, the account number may include significant identifying information, such as a unique geographical identifier. In an exemplary embodiment, a unique account number may be created using the customer's telephone number, a geographical code, which may be a postal code, such as an extended zip code, or the three digit identification code for the nearest airport, and three trailing digits.

Return customers can sign in and enter the website or user interface without registration by giving their account number and password or other identifying information. The sign-in step can be handled automatically by the customer's computer or other connecting device if it is programmed to do so. After signing in, return customers can update identification, billing, viewing format and download pathway information at any time. Once connected to the website or user interface, the customer can browse, search and select one or more movies or other video programs to rent or purchase. Descriptions, reviews, advertisements, clips and trailers of the video materials may be provided to help customers make their selections. Customers can create search agents to help them identify and select movies and video programs that meet certain desired characteristics and/or based on previous selections and the customer's evaluation of them.

The customer selects whether he or she wishes to purchase or rent the video selections and, if appropriate, specifies a time period for the rental. The computer server 113, 114 completes the billing and accounting portion of the transaction and stores the account information in the accounting and billing record database on data storage unit 111. Preferably, billing and payment for the transaction are handled electronically over the Internet using a secure Internet payment protocol.

The selected video data files may be downloaded to the customer immediately or at a later specified time. At the specified time, the computer server 113, 114 through which the request was received accesses the video data file in the appropriate data storage unit 105, 107, 109 and creates a temporary video data file 113A, 113B . . . 113M, 114A, 114B . . . 114M by transferring the video data over a high speed data link to the computer server 113, 114 appropriate for the selected download method. The transfer of video data files over the high speed data link is continuously monitored by error detection and correction software. The video data file is then downloaded to the customer via the appropriate ISP/ASP interface 115, 116. The video data file is downloaded at high speed and stored on the customer's video player device for viewing at a time of the customer's own choosing. The video player device allows the viewer to stop, pause, replay, slow motion replay and fast forward the video program at any time while viewing. The downloading of video data files to the customer is continuously monitored by error detection and correction software.

As mentioned above, the connection between the customer and the video-on-demand system can be asymmetrical. If the customer contacts the system to place an order through a different device than the device used for storing and viewing the video data files, the order processing and the video data file downloading may be handled on different computer servers 113, 114 and/or over different ISP/ASP interfaces 115, 116.

Purchased and/or rented video data files will preferably be downloaded in a copy protected format to prevent unauthorized reproduction or resale of the video data files by the customer. In addition, rented video data files will preferably be downloaded in a time sensitive format that will delete the file or make it inaccessible or unviewable after the expiration of the specified rental period. Alternatively or in addition, rented video data files may be downloaded in a format that limits the number of viewings, after which the files would be deleted or made inaccessible or unviewable. This eliminates the need for returning rented video materials and the inconvenience and potential expense associated with it. If desired, the customer may increase or renew the rental period and/or upgrade a rental to a purchase for an additional fee. This feature may be implemented in such a way that a repeat download of the video data files will be unnecessary, for example by supplying the customer with an authorization number to renew or upgrade the transaction. The system may also be configured to allow prior purchasers of a video data file to download the file again in the event of damage, loss of data corruption of the original video data file.

While the present invention has been described herein with respect to the exemplary embodiments and the best mode for practicing the invention, it will be apparent to one of ordinary skill in the art that many modifications, improvements and subcombinations of the various embodiments, adaptations and variations can be made to the invention without departing from the spirit and scope thereof.

What is claimed is:

1. A multitiered video-on-demand system configured for high speed downloading of video data files with fault tolerance and resistance to data corruption, comprising:
   a first system tier including:
   a first generation video data storage unit for storing original video data files;
   wherein the first system tier is configured to not be remotely accessible by customers of the video-on-demand system;
   a second system tier including:
   a second generation video data storage unit for storing second generation video data files sorted by category and classified in indexed master files;
   a high speed data link between the first generation video data storage unit and the second generation video data storage unit, the high speed data link being configured to allow high speed downloading of video data files from the first generation video data storage unit to the second generation video data storage unit and to prevent uploading of data from the second generation video data storage unit to the first generation video data storage unit, thus resisting data corruption of the original video data files on the first generation video data storage unit;

an error detection system for monitoring the downloading of second generation video data files from the first generation video data storage unit to the second generation video data storage unit and for errors in the second generation video data files, the error detection system being configured to stop the downloading of a second generation video data file if an error is detected and to start the downloading over from the last point where the second generation video data file was known to be not corrupted, the error detection system being further configured to selectively initiate the video-on-demand system to restore the second generation video data file on the second generation video data storage unit from the original video data files on the first generation video data storage unit if repeated errors are detected in the downloading of the second generation video data file;

wherein the second system tier is configured to not be remotely accessible by customers of the video-on-demand system;

a third system tier including:

a remotely accessible computer server configured for accessing the video data files, creating temporary video data files and downloading the temporary video data files for storage and viewing on a customer's video playing device;

a high speed data link between the second generation video data storage unit and the remotely accessible computer server, the high speed data link being configured to allow high speed downloading of video data files from the second generation video data storage unit to the remotely accessible computer server and to prevent uploading of data from the remotely accessible computer server to the second generation video data storage unit, thus resisting data corruption of the second generation video data files on the second generation video data storage unit; and an error detection system for monitoring the downloading of temporary video data files from the remotely accessible computer server and for detecting errors in the temporary video data files, the error detection system being configured to stop the downloading of a temporary video data file if an error is detected and to start the downloading over from the last point where the temporary video data file was known to be not corrupted, the error detection system being further configured to initiate the video-on-demand system to restore the temporary video data file on the remotely accessible computer server from the second generation video data files on the second generation video data storage unit if repeated errors are detected in the downloading of the temporary video data file;

wherein only the third system tier is configured to be remotely accessible by customers of the video-on-demand system.

2. The video-on-demand system of claim 1, further comprising:

a back-up first generation video data storage unit for storing back-up original video data files.

3. The video-on-demand system of claim 1, further comprising:

a back-up second generation video data storage unit for storing back-up video data files.

4. The video-on-demand system of claim 1, further comprising:

at least one video data storage unit for storing versions of the video data files in a specified video display format.

5. The video-on-demand system of claim 4, further comprising:

a back-up video data storage unit for storing back-up copies of the versions of the video data files in the specified video display format.

6. The video-on-demand system of claim 4, further comprising:

a second video data storage unit for storing a second version of the video data files in a second specified video display format.

7. The video-on-demand system of claim 1, wherein the remotely accessible computer server is configured for downloading the temporary video data files to the customer's video playing device via an Internet Service Provider.

8. The video-on-demand system of claim 1, wherein the remotely accessible computer server is configured for downloading the temporary video data files to the customer's video playing device via a wireless Internet Service Provider.

9. The video-on-demand system of claim 1, wherein the remotely accessible computer server is configured for downloading the temporary video data files to the customer's video playing device in a compressed data format.

10. The video-on-demand system of claim 1, further comprising:

a first data input station configured for uploading original video data of movies or other video programs from their original storage medium to a video data capture computer.

11. The video-on-demand system of claim 10, further comprising:

a second data input station configured for uploading original video data of movies or other video programs from electronic data format to the video data capture computer.

12. A multitiered video-on-demand system configured for high speed downloading of video data files with fault tolerance and resistance to data corruption, comprising:

a first system tier including:

a first data input station configured for uploading original video data of movies or other video programs from their original storage medium;

a second data input station configured for uploading original video data of movies or other video programs from electronic data format;

a video data capture computer for converting the original video data to original video data files of a selected data storage format;

a first generation video data storage unit for storing the original video data files;

a back-up first generation video data storage unit for storing back-up original video data files;

a high speed data link between the first generation video data storage unit and the back-up first generation video data storage unit configured to allow high speed transfer of video data files from the first generation video data storage unit to the back-up first generation video data storage unit and to allow high speed transfer of video data files from the back-up first generation video data storage unit to the first generation video data storage unit to refresh or restore the original video data files if data corruption is detected;
wherein the first system tier is configured to not be remotely accessible by customers of the video-on-demand system;
a second system tier including:
a second generation video data storage unit for storing second generation video data files sorted by category and classified in indexed master files;
a high speed data link between the first generation video data storage unit and the second generation video data storage unit, the high speed data link being configured to allow high speed downloading of video data files from the first generation video data storage unit to the second generation video data storage unit and to prevent uploading of data from the second generation video data storage unit to the first generation video data storage unit, thus resisting data corruption of the original video data files on the first generation video data storage unit;
a back-up second generation video data storage unit for storing back-up second generation video data files sorted by category and classified in indexed master files;
a high speed data link between the second generation video data storage unit and the back-up second generation video data storage unit configured to allow high speed transfer of video data files from the second generation video data storage unit to the back-up second generation video data storage unit and to allow high speed transfer of video data files from the back-up second generation video data storage unit to the second generation video data storage unit to refresh or restore the second generation video data files if data corruption is detected;
an error detection system for monitoring the downloading of second generation video data files from the first generation video data storage unit to the second generation video data storage unit and for second generation errors in the temporary video data files, the error detection system being configured to stop the downloading of a second generation video data file if an error is detected and to start the downloading over from the last point where the second generation video data file was known to be not corrupted, the error detection system being further configured to selectively initiate the video-on-demand system to restore the second generation video data file on the second generation video data storage unit from the first generation video data files on the first generation video data storage unit or from the back-up second generation video data files on the back-up second generation video data storage unit if repeated errors are detected in the downloading of the second generation video data file;
a first video data storage unit for storing a first version of the video data files in a first specified video display format;
a back-up first video data storage unit for storing back-up copies of the versions of the video data files in the first specified video display format;
a second video data storage unit for storing a second version of the video data files in a second specified video display format;
a back-up second video data storage unit for storing back-up copies of the versions of the video data files in the second specified video display format;

wherein the second system tier is configured to not be remotely accessible by customers of the video-on-demand system;
a third system tier including:
a first remotely accessible computer server configured for accessing the video data files in the second generation video data storage unit, the first video data storage unit and/or the second video data storage unit, creating temporary video data files and downloading the temporary video data files via an Internet Service Provider for storage and viewing on a customer's video playing device;
a high speed data link between the second generation video data storage unit and the first remotely accessible computer server, the high speed data link being configured to allow high speed downloading of video data files from the second generation video data storage unit to the first remotely accessible computer server and to prevent uploading of data from the first remotely accessible computer server to the second generation video data storage unit, thus resisting data corruption of the second generation video data files on the second generation video data storage unit;
a second remotely accessible computer server configured for accessing the video data files in the second generation video data storage unit, the first video data storage unit and/or the second video data storage unit, creating temporary video data files and downloading the temporary video data files via a wireless Internet Service Provider for storage and viewing on a customer's video playing device;
a high speed data link between the second generation video data storage unit and the second remotely accessible computer server, the high speed data link being configured to allow high speed downloading of video data files from the second generation video data storage unit to the second remotely accessible computer server and to prevent uploading of data from the second remotely accessible computer server to the second generation video data storage unit, thus resisting data corruption of the second generation video data files on the second generation video data storage unit; and
an error detection system for monitoring the downloading of temporary video data files from the first and second remotely accessible computer servers and for detecting errors in the temporary video data files, the error detection system being configured to stop the downloading of a temporary video data file if an error is detected and to start the downloading over from the last point where the temporary video data file was known to be not corrupted, the error detection system being further configured to initiate the video-on-demand system to restore the temporary video data file on the first and/or second remotely accessible computer servers from the second generation video data files on the second generation video data storage unit if repeated errors are detected in the downloading of the temporary video data file;
wherein only the third system tier is configured to be remotely accessible by customers of the video-on-demand system.

* * * * *

UNITED STATES PATENT AND TRADEMARK OFFICE
CERTIFICATE OF CORRECTION

| | | |
|---|---|---|
| PATENT NO. | : 7,254,622 B2 | Page 1 of 1 |
| APPLICATION NO. | : 09/738425 | |
| DATED | : August 7, 2007 | |
| INVENTOR(S) | : Tetsuya Nomura | |

It is certified that error appears in the above-identified patent and that said Letters Patent is hereby corrected as shown below:

Title Page, item [76] Inventors: should read

--Tetsuya Nomura.--

Signed and Sealed this

Twentieth Day of November, 2007

JON W. DUDAS
*Director of the United States Patent and Trademark Office*